US009243544B2

(12) United States Patent
Többen et al.

(10) Patent No.: US 9,243,544 B2
(45) Date of Patent: Jan. 26, 2016

(54) EXHAUST SYSTEM WITH LINE ELEMENT

(71) Applicant: Eberspächer Exhaust Technology GmbH & Co. KG, Neunkirchen (DE)

(72) Inventors: Heike Többen, Uhingen (DE); Silvia Calvo, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 2 days.

(21) Appl. No.: 14/050,732

(22) Filed: Oct. 10, 2013

(65) Prior Publication Data
US 2014/0102082 A1 Apr. 17, 2014

(30) Foreign Application Priority Data

Oct. 11, 2012 (DE) .......................... 10 2012 218 565

(51) Int. Cl.
| F01N 3/00 | (2006.01) |
| F01N 13/08 | (2010.01) |
| F01N 3/20 | (2006.01) |
| F01N 3/28 | (2006.01) |
| F01N 13/18 | (2010.01) |

(52) U.S. Cl.
CPC .............. *F01N 13/08* (2013.01); *F01N 3/2066* (2013.01); *F01N 3/2892* (2013.01); *F01N 13/1816* (2013.01); *F01N 2240/20* (2013.01); *F01N 2470/02* (2013.01); *F01N 2470/12* (2013.01); *F01N 2610/02* (2013.01); *F01N 2610/1453* (2013.01); *Y02T 10/24* (2013.01)

(58) Field of Classification Search
CPC . F01N 3/2066; F01N 3/2892; F01N 13/1816; F01N 13/08; F01N 2470/02; F01N 2470/12; F01N 2610/02; F01N 2610/1453
USPC ........................................................... 60/295
See application file for complete search history.

(56) References Cited

U.S. PATENT DOCUMENTS

| 6,401,449 | B1 * | 6/2002 | Hofmann et al. ................ 60/274 |
| 2003/0079467 | A1 * | 5/2003 | Liu et al. ........................... 60/286 |
| 2010/0212301 | A1 * | 8/2010 | De Rudder et al. ............. 60/299 |
| 2014/0033686 | A1 * | 2/2014 | Fischer et al. ................... 60/286 |

FOREIGN PATENT DOCUMENTS

| DE | 19 641 963 C1 | 10/1997 |
| DE | 10 2004 020 138 A1 | 11/2005 |
| DE | 11 2008 000 557 T5 | 2/2010 |

(Continued)

OTHER PUBLICATIONS

English Translation of French Patent Application Publication No. FR 2971546 A1 (Aug. 2012).*

*Primary Examiner* — Jason Shanske
(74) *Attorney, Agent, or Firm* — McGlew and Tuttle, P.C.

(57) ABSTRACT

A flexible line element (14), for an exhaust system (4) of an internal combustion engine (1), especially of a motor vehicle, includes a metal bellows (15), which is corrugated in a ring-shaped or helical pattern and through which an exhaust gas stream (8) can flow. The risk of deposition of urea and/or urea derivatives in the metal bellows (15) is reduced by a conical flow guide body (16), through which the exhaust gas stream (8) can flow, and which tapers in the direction of flow of the exhaust gas stream and which protrudes into an inlet area (17) of the metal bellows (15). The flexible line element (14) is combined with the flow guide body (16) integrated therein.

19 Claims, 4 Drawing Sheets

(56) References Cited

FOREIGN PATENT DOCUMENTS

| | | | |
|---|---|---|---|
| DE | 102011015772 A1 * | 1/2012 | |
| DE | 10 2010 056 314 A1 | 6/2012 | |
| EP | 0 736 714 A1 | 10/1996 | |
| FR | 2971546 A1 * | 8/2012 | |
| WO | WO 2005103459 A1 * | 11/2005 | |
| WO | WO 2012089290 A1 * | 7/2012 | |

* cited by examiner

EXHAUST SYSTEM WITH LINE ELEMENT

CROSS REFERENCE TO RELATED APPLICATIONS

This application claims the benefit of priority under 35 U.S.C. §119 of German Patent Application DE 10 2012 218 565.8 filed Oct. 11, 2012, the entire contents of which are incorporated herein by reference.

FIELD OF THE INVENTION

The present invention pertains to a flexible line element for an exhaust system of an internal combustion engine with metal bellows, which is corrugated in a ring-shaped or helical pattern and through which an exhaust gas stream can flow. The present invention pertains, in addition, to an exhaust system for an internal combustion engine, especially of a motor vehicle, which is equipped with at least one such flexible line element.

BACKGROUND OF THE INVENTION

A flexible line element, which comprises essentially a metal bellows, which is corrugated in a ring-shaped or helical pattern and through which an exhaust gas stream can flow, is known from DE 196 41 963 C1. The metal bellows may be lined with a flexible tube made of a braiding or knitted fabric on its inside facing the exhaust gas stream and/or on its outside facing away from the exhaust gas stream. The metal bellows may be connected upstream and/or downstream to a line section of the line element or of the exhaust system in the installed state.

Such a flexible line element is used within the exhaust system essentially to uncouple vibrations and may be arranged typically between a section of the exhaust system arranged in a fixed manner at the internal combustion engine and a section of the exhaust system arranged on the vehicle. Such a flexible line element may also be called uncoupling element. The flexible line element forms a part of the exhaust system in the installed state, so that the line element may also be called exhaust pipe element.

Modern exhaust systems may be equipped with an SCR system for reducing nitrogen oxides in the exhaust gas, where SCR denotes Selective Catalytic Reduction. Such an SCR system comprises a reducing agent feed means as well as an SCR catalytic converter downstream therefrom. A suitable reducing agent can be introduced into the exhaust gas stream by means of the reducing agent feed means. For example, ammonia is suitable for use as a reducing agent. However, urea or an aqueous urea solution is preferably introduced into the exhaust gas stream.

There is a risk under unfavorable boundary conditions or operating states of the internal combustion engine that urea and/or urea derivatives are formed in the exhaust gas stream, and these may become deposited on the walls of exhaust gas-carrying components. Such deposits of urea and/or urea derivatives can be regenerated, i.e., especially removed, dissolved or evaporated in favorable operating states. Unfavorable boundary conditions are, for example, low exhaust gas temperatures and low flow velocities in the exhaust gas. Insufficient mixing of the urea introduced with the exhaust gas stream may occur now. Furthermore, overdosage of urea is conceivable, in principle. Favorable boundary conditions are, by contrast, higher exhaust gas temperatures and higher flow velocities in the exhaust gas stream.

It may be desirable in exhaust systems with SCR system to install a flexible line element of the above-described type between the SCR catalytic converter and the reducing agent feed means. This is associated with the increased risk that the undesired deposits of urea derivatives will be formed precisely within the metal bellows. This applies especially to the case in which the metal bellows is exposed to the exhaust gas stream on its inside without an additional protective layer. The corrugated structure of the inside offers ideal possibilities for the deposition of urea and/or urea derivatives. It is problematic in this connection that the possibility of regeneration, i.e., also the possibility of evaporating or flushing out the urea and/or urea derivatives from the corrugated structure is significantly reduced, because direct admission with the exhaust gas stream is not usually possible there. What is formed in the area of the corrugated structure is a flow boundary layer, in which transverse motions hardly occur. However, the deposits in the metal bellows lead to the metal bellows becoming more rigid, as a result of which the function of the metal bellows as an uncoupling element is increasingly reduced.

SUMMARY OF THE INVENTION

An object of the present invention is therefore to provide an improved embodiment for a flexible line element of the type mentioned in the introduction, or for an exhaust system equipped therewith, which is characterized especially in that the risk of undesired deposits in the metal bellows is reduced.

According to the invention, a flexible line element for an exhaust system of an internal combustion engine of a motor vehicle is provided comprising a metal bellows and a conical flow guide body. The metal bellows is corrugated in a ring-shaped or helical pattern through which an exhaust gas stream can flow. The conical flow guide body, through which the exhaust gas stream can flow, tapers in the direction of flow of the exhaust gas stream. The conical flow guide body protrudes into an inlet area of the metal bellows in a detached manner.

The present invention is based on the general idea of arranging at the inlet area of the metal bellows a conical flow guide body, which tapers in the direction of flow and through which the exhaust gas stream can flow. In other words, the present invention generally proposes the creation of a combination or a unit comprising a flexible line element and a flow guide body integrated therein. The exhaust gas stream, which flows through the metal bellows, is concentrated during the flow through the flow guide body due to this measure. On the one hand, the velocity of flow is increased thereby, which reduces the risk of deposits in the metal bellows. On the other hand, the exhaust gas stream is removed from the inside of the metal bellows, i.e., the distance between the exhaust gas stream and the metal bellows is increased, as a result of which the risk of deposits is likewise reduced.

The flow guide body is advantageously arranged at the metal bellows such that it protrudes into the inlet area in a detached manner. Direct admission of exhaust gas to the inside of the metal bellows is efficiently prevented from occurring in this manner already in the inlet area. At the same time, the flexibility of the metal bellows is prevented from being compromised due to the flow guide body protruding in a detached manner. In particular, the flow guide body with its outlet end cannot be supported at the metal bellows, which would considerably compromise the flexibility of the metal bellows.

Provisions may, furthermore, advantageously be made for an inlet end of the flow guide body to fill the cross section of the line element through which flow is possible at the inlet area of the metal bellows. In other words, the conical flow guide body radially adjoins with its inlet end the inner cross section of the metal bellows or of a line section of the line element, which said line section is arranged upstream of the metal bellows. The exhaust gas stream is forced as a consequence to flow as a whole, i.e., completely through the flow guide body.

Furthermore, especially advantageous is an embodiment in which the conical flow guide body is arranged concentrically in relation to a central longitudinal axis of the metal bellows. The exhaust gas stream is constricted concentrically in relation to the central longitudinal axis of the metal bellows during its flow through the flow guide body, so that the distance between the metal bellows and the exhaust gas flow can be increased uniformly in the circumferential direction.

The conical flow guide body may be designed as a truncated cone. It is likewise possible, in principle, to design the flow guide body as part of a sphere or as part of an ellipsoid.

According to an advantageous embodiment, the flow guide body may be fastened with its inlet end to the metal bellows. The metal bellows may have a cylindrical port at its inlet area. The flow guide body may be shaped complementarily thereto at its inlet end.

It is also possible as an alternative to design the flexible line element with a line section arranged upstream of the metal bellows, at which line section the flow guide body with its inlet end is fastened. The line section advantageously also has a cylindrical area, at which the flow guide body can be fastened on the inlet side.

In an advantageous embodiment, the flow guide body may be a conical tubular body, which is axially open on the inlet side and/or on the outlet side. This leads to an especially simple design, which has a comparatively low flow resistance.

A jacket of the tubular body may be perforated in order to reduce the flow resistance of the flow guide body.

According to an especially advantageous embodiment, a depositing means for urea and/or urea derivatives may be arranged in the tubular body. The depositing means is advantageously configured such that it cooperates with a boundary layer of the exhaust gas stream only in order to deposit entrained liquid urea and entrained urea derivatives in the boundary layer of the exhaust gas stream, e.g., from the wall film, which may be formed on an inside of the tubular body facing the exhaust gas stream, e.g., by precipitation and/or condensation. Such an embodiment is advantageous in several respects. On the one hand, the urea and the urea derivatives formed during unfavorable operating conditions can be specifically deposited with such a depositing means, as a result of which deposit on components located downstream, especially in the metal bellows, can be prevented from occurring. On the other hand, there is an especially high velocity of flow in the exhaust gas stream in the flow guide body, i.e., also at the depositing means, in favorable operating states. At the same time, the detached flow guide body and hence also the depositing means can be heated especially well by the exhaust gas stream, as a result of which regeneration of deposited urea and/or of the deposited urea derivatives is facilitated.

Such a depositing means may be designed, in principle, in the manner of a urea trap, which does, however, permit regeneration or release of the deposited urea and of the deposited urea derivatives. For example, the depositing means may be designed as a collection means for deposits of urea derivatives or have such a collection means. In addition or as an alternative, the depositing means may be designed as a flow obstacle for a boundary layer of the exhaust gas stream. For example, such a flow obstacle may be embodied by means of a diaphragm, by means of a ring, by means of a perforated plate and/or by means of a wire mesh.

A static mixer may be arranged or formed in the tubular body of the flow guide body in another advantageous embodiment. The exhaust gas stream, which flows through the flow guide body, can be intensively mixed by means of such a static mixer. Since the introduction of the reducing agent takes place upstream of the flow guide body, the static mixer also brings about intensive mixing of the reducing agent with the exhaust gas stream. The improved mixing reduces the risk of formation of derivatives.

According to an advantageous variant, the mixer may be designed as a separate component and inserted into the tubular body. As a result, it is possible to use a mixer, which is present per se, and to install it in the flow guide body, which can reduce the costs of development. However, It is also possible, as an alternative, to form guide blades, which form the mixer, on a jacket of the tubular body. The guide blades are integral components of the jacket or of the tubular body in this case, so that the mixer is ultimately also formed integrally on the flow guide body. Assembly is simplified hereby, because the flow guide body is already manufactured with the mixer.

The flow guide body may be a conical solid body, which consists of a material or material mixture through which flow is possible, in another advantageous embodiment. The solid body may comprise, for example, at least a ceramic foam or at least a metal foam or at least a wire netting or at least a wire mesh or any desired combination of the above-mentioned structures. The solid body, through which flow is possible, acts at the same time as a urea trap or as a depositing means, so that the solid body, through which flow is possible, can separate urea being entrained in the exhaust gas stream and/or entrained urea derivatives from the exhaust gas stream. The solid body, through which flow is possible, can be regenerated and it can release urea deposited therein and/or urea derivatives deposited therein can be released in case of favorable operating states.

In another advantageous embodiment, an additional flow guide body may be provided, through which the exhaust gas stream can flow and which protrudes into an outlet area of the metal bellows in a detached manner. The exhaust gas flow concentrated by the inlet-side flow guide body can be quasi captured by means of this additional flow guide body arranged on the outlet side and removed from the metal bellows. On the whole, the risk of exposure of the metal bellows to the exhaust gas stream can be reduced hereby. At the same time, the possibility of deposition of urea and/or urea derivatives on the inside of the metal bellows decreases as a result as well.

Especially advantageous here is a variant in which the flow guide body arranged on the inlet side protrudes with its outlet end into an inlet end of the additional flow guide body arranged on the outlet side in a detached manner. In particular, the two flow guide bodies may also overlap each other axially. An annular gap is present now between the inner outlet end of the inlet-side flow guide body and the outer inlet end of the outlet-side flow guide body, and this gap is fully circumferential in the circumferential direction and which has a comparatively great gap width in the radial direction, such that the metal bellows continues to be elastically or flexibly movable without the two flow guide bodies touching each other.

In another embodiment, the flow guide body arranged on the outlet side with its outlet end can be fastened via webs to the metal bellows or to a line section, which is arranged downstream of the metal bellows. In addition or as an alternative, the flow guide body arranged on the outlet side may taper at least in one longitudinal section in the direction of flow. It is likewise possible that the outlet-side flow guide body expands in the area of its outlet end in the direction of flow, especially to the extent that the outlet-side flow guide body can be supported at its outlet end directly at the metal bellows or at the line section arranged downstream.

The metal bellows may be provided with a protective layer, e.g., in the form of a flexible knitted tube or fabric tube, on its inside and/or on its outside. Furthermore, it is possible, in particular, to provide the metal bellows on its outside with a spiral wound metallic hose, which coaxially encloses the flexible metal tube. Such a spiral wound metallic hose comprises especially a metal strip having an S-shaped profile, which is wound up helically, and adjacent lateral edges of the metal strip mesh with one another within the windings. Such a spiral wound metallic hose has a comparatively high stability under tensile load and stability under compressive load as well as relatively high flexibility. In addition or as an alternative, the metal bellows may be manufactured from a single-layer metal plate or alternatively from a multilayer metal plate.

An exhaust system according to the present invention for an internal combustion engine, which may be arranged especially in a motor vehicle, thus comprises at least one exhaust gas line, in which an SCR catalytic converter and, upstream therefrom, a reducing agent feed means for introducing a reducing agent into the exhaust gas stream are arranged. The exhaust system according to the present invention comprises, furthermore, a flexible line element of the type described above in the exhaust gas line between the reducing agent feed means and the SCR catalytic converter.

It is apparent that the above-mentioned features, which will also be explained below, may be used not only in the particular combination indicated, but in other combinations or alone as well, without going beyond the scope of the present invention.

Preferred exemplary embodiments are shown in the drawings and will be explained in more detail in the following description, in which identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
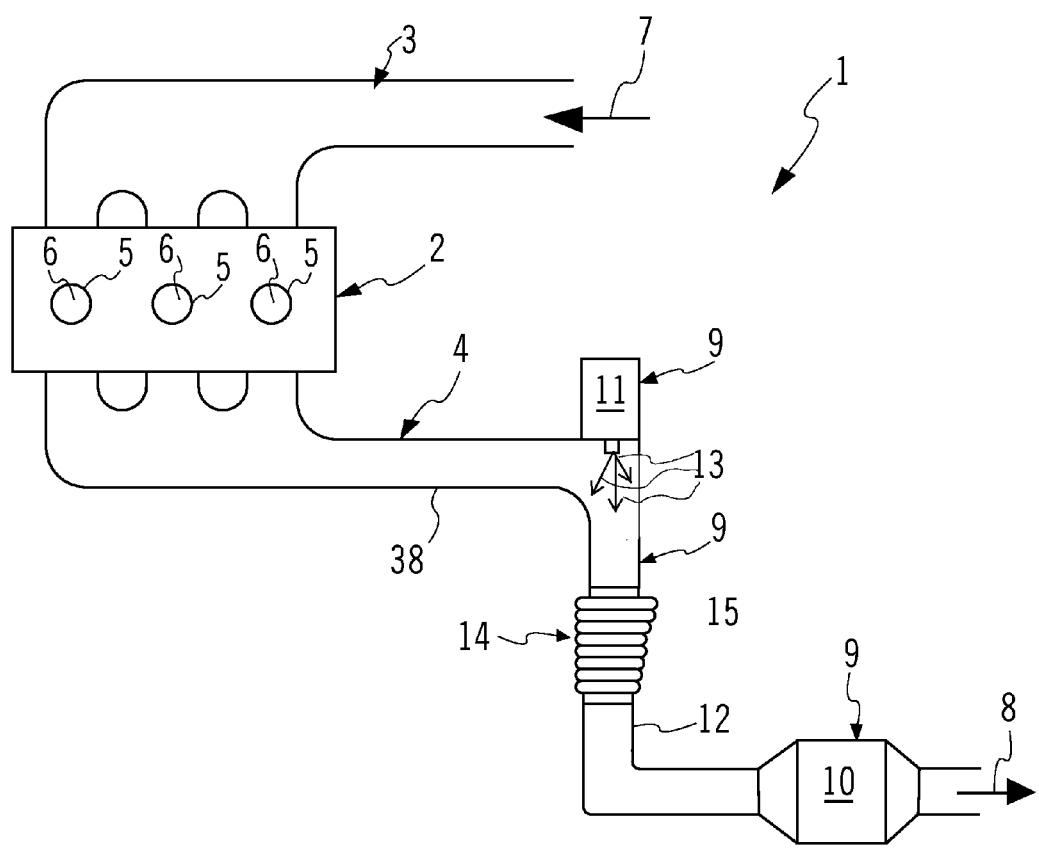
FIG. 1 is a highly simplified, circuit diagram-like schematic view of an internal combustion engine with an exhaust system.

Referring to the drawings in particular, corresponding to FIG. 1, an internal combustion engine 1 comprises an engine block 2, a fresh air feed unit 3 and an exhaust system 4. Engine block 2 contains a combustion chamber 6 each in a plurality of cylinders 5. The fresh air feed unit 3 is used to supply the combustion chambers 6 with fresh air. A corresponding fresh air stream 7 is indicated by an arrow. The fresh air feed unit 4 comprises at least one exhaust gas line 38 and is used to remove exhaust gas from the combustion chambers 6. A corresponding exhaust gas stream 8 is indicated by an arrow. The exhaust system 4 is equipped with an SCR system, which comprises in the exhaust gas line 38 an SCR catalytic converter 10, a reducing agent feed means 9 and a mixing section 12, which leads from the reducing agent feed means 9 to the SCR catalytic converter 10. The reducing agent feed means 9 can feed a reducing agent 11, preferably aqueous urea solution, into the exhaust gas stream 8. Corresponding to arrows 13, the reducing agent 11 is introduced, especially injected or sprayed for this into the exhaust system 4. The mixing section 12, which guides the exhaust gas stream with the reducing agent 13 introduced into it from the reducing agent feed means 9 to the SCR catalytic converter 10, is formed by a section of the exhaust system 4 or of the exhaust gas line 38. The SCR catalytic converter 10 is arranged downstream of the reducing agent feed means 9 and makes possible a selective catalytic reduction of nitrogen oxides during the operation.

The exhaust system 4 is equipped with a flexible line element 14, which is arranged in this case between the SCR catalytic converter 10 and the reducing agent feed means 11, i.e., in the mixing section 12. Line element 14 comprises, corresponding to FIGS. 1-5, a metal bellows 15 corrugated in a ring-shaped or helical pattern, and the exhaust gas stream 8 can flow through it.

Corresponding to FIGS. 2-5, the flexible line element 14 comprises, besides, a conical flow guide body 16. The exhaust gas stream 8 can likewise flow through the flow guide body 16 and flow guide body 16 tapers in the direction of flow of the exhaust gas stream 8. Furthermore, flow guide body 16 is arranged such that it protrudes into an inlet area 17 of the metal bellows 15 in a detached manner. The flow guide body 16 is always truncated cone-shaped in the embodiments being shown, so that it has a flat inlet end 19 as well as a flat outlet end 20 at right angles to the central longitudinal axis 18 of the metal bellows 15. However, other embodiments of the flow guide body 16 are conceivable, in principle, as well, for example, in the form of a spherical segment or of an ellipsoid segment.

The flow guide body 16 with its inlet end 19 is fastened in the embodiments being shown in this case to a line section 21, which is located upstream of the metal bellows 15 and is connected to the metal bellows 15. The flow guide body 16 may, in principle, also be fastened with its inlet end 19 directly to the metal bellows 15. The line element 21 arranged upstream can define an inlet-side port of the metal bellows 15 or of the line element 14, with which the line element 14 can be connected into the exhaust gas line 38 of the exhaust system 4. Line element 14 correspondingly also comprises a line section 22, which is arranged downstream and which defines a port of the metal bellows 15 or of the line element 14, with which the line element can be connected on the outflow side into the exhaust gas line 38 of the exhaust system 4.

Figure 2:
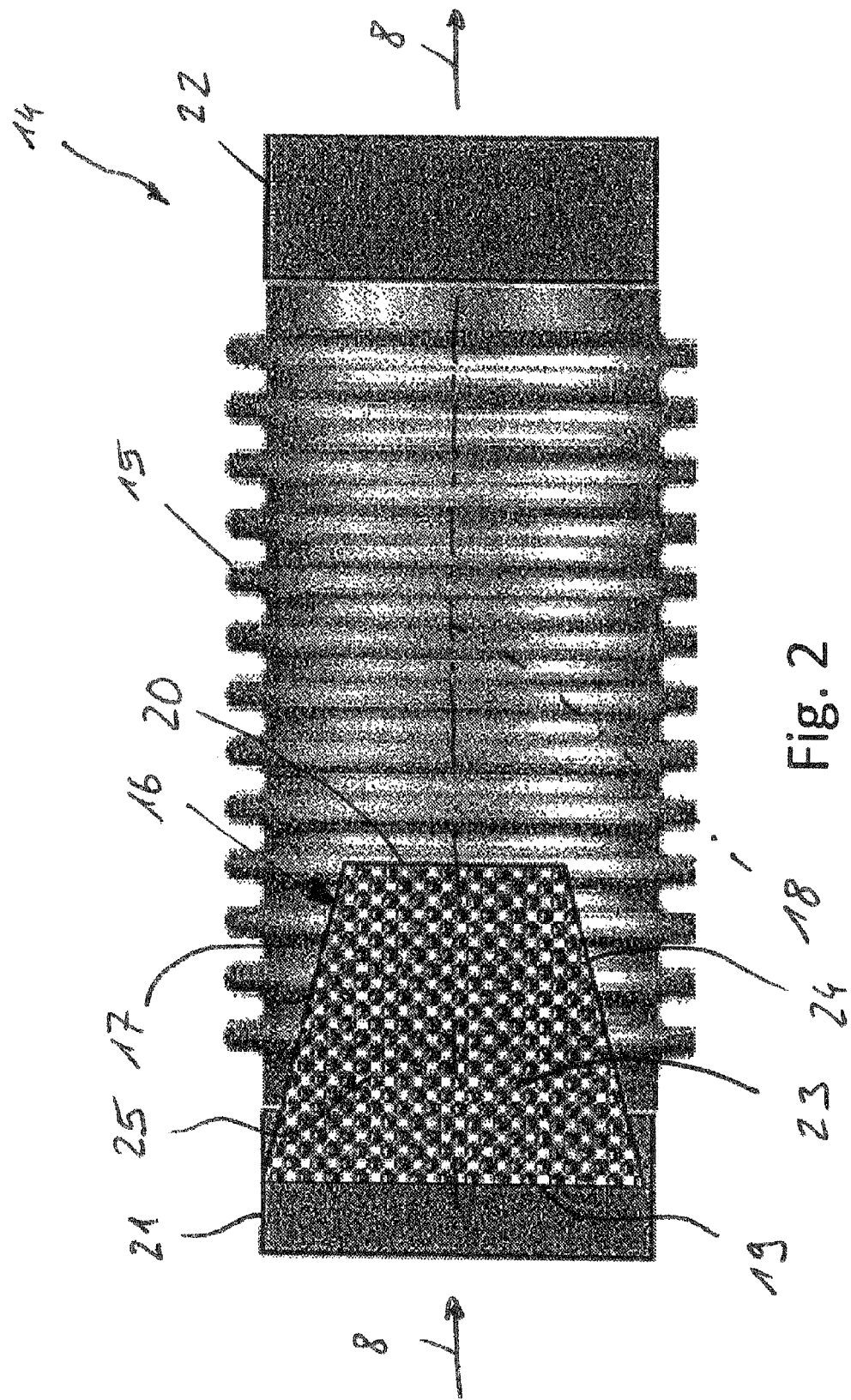
FIG. 2 is a highly simplified longitudinal sectional view of a flexible line element showing one of different embodiments.
Figure 3:
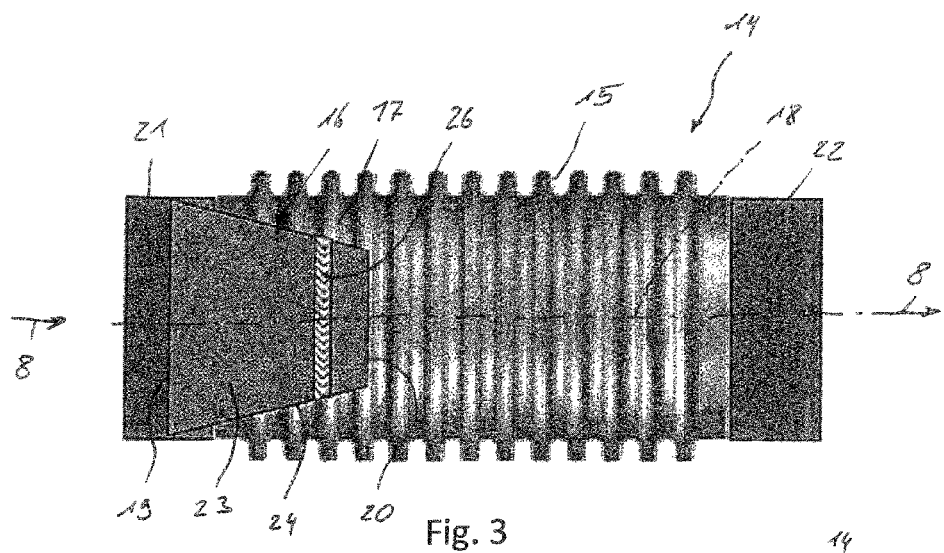
FIG. 3 is a highly simplified longitudinal sectional view of a flexible line element showing another of different embodiments.
Figure 5:
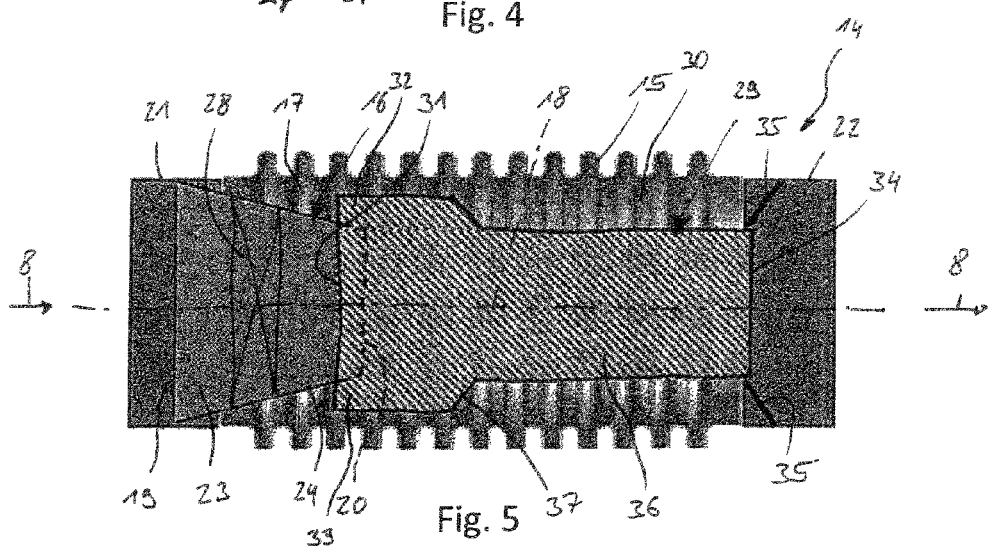
FIG. 5 is a highly simplified longitudinal sectional view of a flexible line element showing another of different embodiments.

In the embodiments according to FIGS. 1, 3 and 5, the flow guide body 16 is preferably a conical tubular body 23, whose jacket 24 may have a perforation 25 in the embodiment shown in FIG. 2.

The flow guide body 16 is arranged coaxially or concentrically with the central longitudinal axis 18 of the metal bellows 15 in all the embodiments shown here, so that flow guide body 16 is arranged symmetrically in the metal bellows 15. The flow guide body 16 is advantageously connected such that its inlet end 19, completely closed radially on the outside in the circumferential direction, comes into contact with an inside of line element 14, so that the entire exhaust gas stream 8 is forced to flow through the flow guide body 16.

According to the embodiment shown in FIG. 3, tubular body 23 may contain a depositing means 26 for urea or urea derivatives. Depositing means 26 is arranged in the cross section of tubular body 23, through which cross section flow is possible, such that at least urea or urea derivatives, which are entrained in a boundary layer of the exhaust gas stream 8, can be deposited from the exhaust gas stream 8. Such a depositing means 26 may be designed, for example, as a collection means for urea derivative deposits or have such a collection means. In addition, or as an alternative, depositing means 26 may be designed as a flow obstacle for a radially outer boundary layer of the exhaust gas stream 8. The flow obstacle is, for example, a ring-shaped diaphragm, which may be manufactured especially from a perforated plate. The flow guide body may also be a wire mesh, which is preferably arranged in a ring-shaped pattern.

Figure 4:
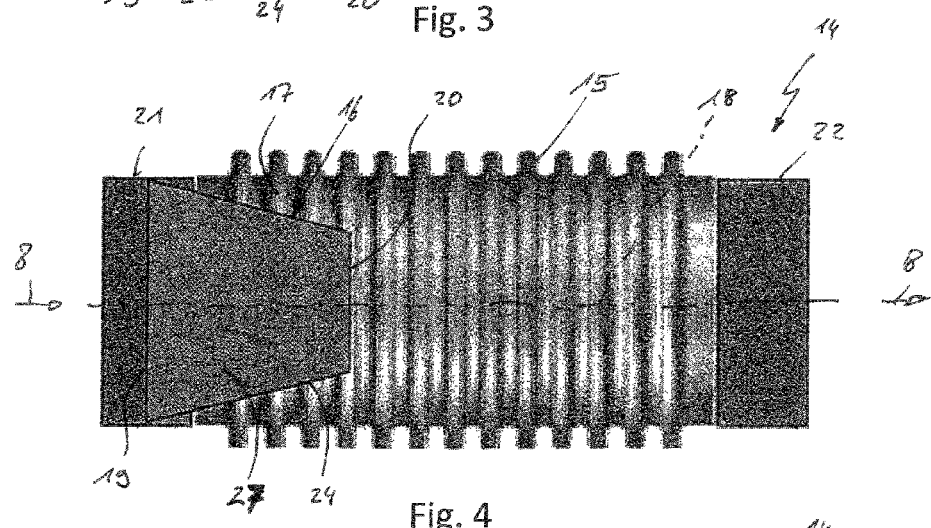
FIG. 4 is a highly simplified longitudinal sectional view of a flexible line element showing another of different embodiments.

Flow guide body 16 is formed in the embodiment shown in FIG. 4 by a conical solid body 27, through which flow is likewise possible, and consists for this of a material or material mixture through which flow is possible. Suitable materials are, for example, ceramic foam, metal foam, sintered metal, wire netting, and wire mesh. The solid body 27 may consist of each of these materials or of any desired combination thereof.

Figures 6A, 6B:
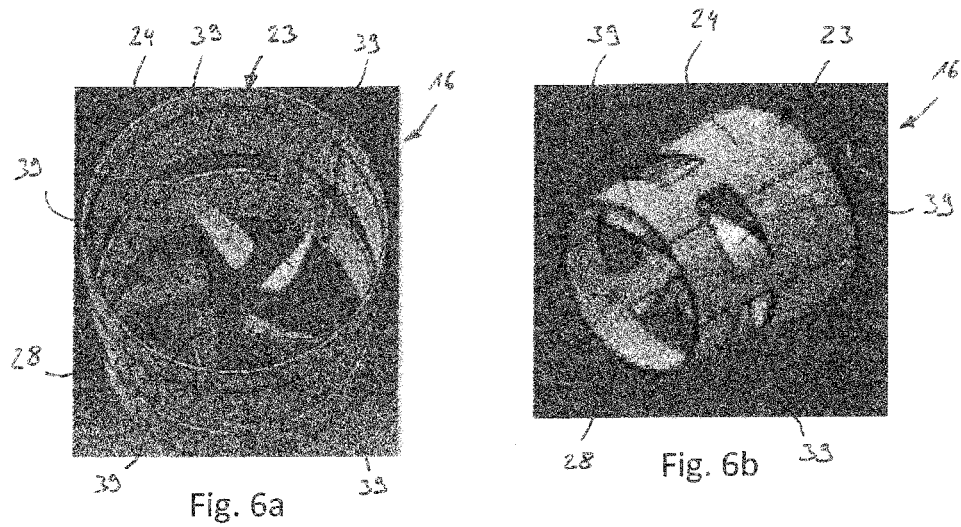
FIG. 6a is an isometric view of a flow guide body of a special embodiment shown in one direction.
FIG. 6b is an isometric view of a flow guide body of the special embodiment of FIG. 6a, shown in another direction.
Figure 7:
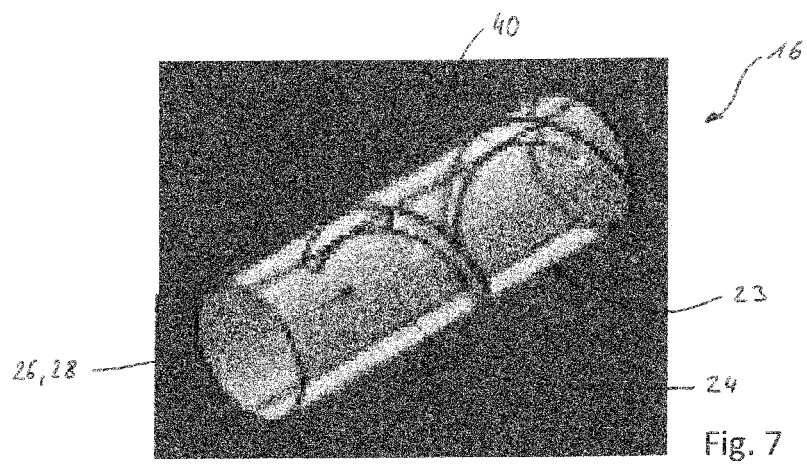
FIG. 7 is a partly transparent isometric view of the flow guide body for another embodiment.

A static mixer 28 may be arranged or formed in the tubular body 23 in the embodiment shown in FIG. 5. Mixer 28 may be designed, for example, as a separate component, which is inserted into the tubular body 23 or into the jacket 24. As an alternative, it is conceivable, in principle, to form guide blades, not shown in FIG. 5, which form the mixer 28, integrally on jacket 24. For example, the conical, hollow tubular body 23 may have guide blades 39 cut out of its jacket 24 and bent inwardly according to FIGS. 6a and 6b. The guide blades 39 do not preferably touch each other and define the mixer 28. The guide blades 39 preferably have a uniform pitch angle and/or are wound uniformly, so that they can impart a twist to the exhaust gas stream 8 flowing through. FIG. 7 indicates another embodiment, in which a spiral baffle 40, which winds along the inside of jacket 24, shown as a transparent jacket, in a helical pattern and projects inwardly, is provided instead of a plurality of guide blades 39. A twist can be imparted to the exhaust gas stream 8 by means of this spiral baffle 40 as well. Spiral baffle 40 may act in this case as a mixer. Spiral baffle 40 may also form a flow obstacle, which acts as a depositing means 26, by means of which urea and/or urea derivatives can be deposited from the flow boundary layer. Even though the tubular body 23 is shown essentially as a cylindrical body in the view shown in FIG. 7, it is also possible, in principle, to arrange or form a mixer 28 and/or a depositing means 26 upstream of the flow guide body 16 in the incoming flow-side line section 21.

Another flow guide body 29 is provided in the embodiment shown in FIG. 5. The exhaust gas stream 8 can likewise flow through this additional flow guide body 29 and this flow guide body protrudes into an outlet area 30 of the metal bellows 15 in a detached manner. This leads between the two flow guide bodies 16, 29 to an axial overlap 32, which form a circular annular space 33 that is closed in the circumferential direction, so that the two flow guide bodies 16, 29 do not touch each other.

The outlet-side flow guide body 29 is fastened with its outlet end 34 to the metal bellows 15 or to the outlet-side line section 22 via, for example, webs 35. The outlet-side flow guide body 29 is preferably likewise a tubular body 36, which may have, on the whole, a conical design. Tubular body 36 is conical in the example being shown in a line section 37 only, such that it tapers in the direction of flow of the exhaust gas stream 8.

Figure 8:
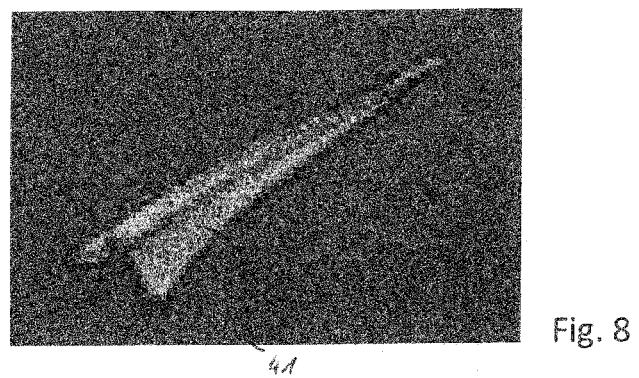
FIG. 8 is an isometric view of another flow guide body in the form of a delta wing.

In addition, or as an alternative to this additional or outlet-side tubular flow guide body 29, at least one other flow guide body 41 may be provided, which may be arranged in the incoming flow-side flow guide body 126 or upstream therefrom or downstream therefrom. This additional flow guide body 41 may also be arranged in the outlet-side flow guide body 29 or upstream therefrom or downstream therefrom. According to FIG. 8, such an additional flow guide body 41 may be designed, for example, as a delta wing, which may be arranged on jacket 24 or, for example, by means of corresponding webs, not shown here, in a largely detached manner in the line element 14, especially in the incoming flow-side or outgoing flow-side flow guide body 16, 29. A plurality of such flow guide elements 41 are preferably arranged on jacket 24 distributed in the circumferential direction.

The individual features of the variants of the line element 14 shown here may be combined with one another, insofar as meaningful, as desired. For example, the outlet-side flow guide body 29 of the embodiment shown in FIG. 5 may also be embodied in the embodiments shown in FIGS. 2 through 4. Furthermore, the perforated wall 25 of the embodiment shown in FIG. 2 may also be embodied in the inlet-side flow guide bodies 16 of the embodiments according to FIGS. 3 and 5 as well as in the outlet-side flow guide body 29 of the embodiment according to FIG. 5. Furthermore, the depositing means 26 of the embodiment shown in FIG. 3 (and in FIG. 7) may also be embodied in the inlet-side flow guide bodies 16 of the embodiments according to FIGS. 4 and 5 as well as in the outlet-side flow guide body 29 according to FIG. 5. Mixer 28, which is provided in the inlet-side flow guide body 16 in the embodiment shown in FIG. 5 (and in FIGS. 6 and 7), may also be embodied in the embodiments according to FIGS. 2 and 3. In addition or as an alternative, it is possible, in principle, to arrange such a mixer 28 in the outlet-side flow guide body 29 according to FIG. 5.

While specific embodiments of the invention have been shown and described in detail to illustrate the application of the principles of the invention, it will be understood that the invention may be embodied otherwise without departing from such principles.

What is claimed is:
1. A flexible line element for an exhaust system of an internal combustion engine of a motor vehicle, the flexible line element comprising:
a metal bellows which is corrugated in a ring-shaped or helical pattern and through which an exhaust gas stream can flow, said metal bellows comprising a metal bellows outlet and a plurality of corrugations, said plurality of corrugations defining a bellows interior;

a conical flow guide body through which the exhaust gas stream can flow, and which tapers in the direction of flow of the exhaust gas stream and which protrudes into an inlet area of the metal bellows in a detached manner, said conical flow guide body comprising a conical flow guide outlet portion, said conical flow guide outlet portion being arranged in said bellows interior, said conical flow guide outlet portion being located at a spaced location from said metal bellows outlet; and an additional flow guide body, through which the exhaust gas stream flows and which protrudes into an outlet area of the metal bellows in a detached manner, said additional flow guide body comprising an additional flow guide body inlet and an additional flow guide body outlet, said additional flow guide body inlet being located in said bellows interior, said additional flow guide body outlet being located at or adjacent to said metal bellows outlet.

2. A flexible line element in accordance with claim 1, wherein the conical flow guide body comprises a conical flow guide inlet portion fastened directly to the metal bellows, wherein said conical flow guide outlet portion is located at a spaced location from said plurality of corrugations, said conical flow guide inlet portion being located at a spaced location from said corrugations.

3. A flexible line element in accordance with claim 1, further comprising a line section arranged upstream of the metal bellows, the flow guide body being fastened directly to an inlet end of the line section.

4. A flexible line element in accordance with claim 2, wherein the flow guide body is a conical tubular body, said conical flow guide inlet portion having a conical flow guide inlet portion dimension, said metal bellows having a metal bellows inner surface, said metal bellows inner surface defining a metal bellows inlet dimension, said conical flow guide inlet portion dimension corresponding to said metal bellows inlet dimension.

5. A flexible line element in accordance with claim 4, wherein the tubular body has a perforated jacket.

6. A flexible line element in accordance with claim 4, wherein a depositing means for deposits of urea and/or urea derivatives is arranged in the tubular body.

7. A flexible line element in accordance with claim 6, wherein at least one of:
the depositing means comprises a collection device for collecting deposits of urea derivatives; and
the depositing means comprises a flow obstacle.

8. A flexible line element in accordance with claim 4, further comprising a static mixer arranged or formed in the tubular body.

9. A flexible line element in accordance with claim 8, wherein at least one of:
the mixer is designed as a separate component and is inserted into the tubular body; or
guide blades form the mixer, the guide blades being formed on a jacket of the tubular body.

10. A flexible line element in accordance with claim 1, wherein the flow guide body comprises a material or material mixture through which flow is possible.

11. A flexible line element in accordance with claim 10, wherein the solid body comprises at least one of a ceramic foam portion, wire netting, and a wire mesh.

12. A flexible line element in accordance with claim 1, wherein at least one of:

the flow guide body arranged on the inlet side protrudes with an outlet end into an inlet end of the additional flow guide body arranged on the outlet side in a detached manner; and the flow guide body arranged on the outlet side is fastened with an outlet end, via webs to the metal bellows or to a line section arranged downstream of metal bellows; and the flow guide body arranged on the outlet sides tapers at least in one longitudinal section in a direction of flow of the exhaust gas stream.

13. An exhaust system for an internal combustion engine of a motor vehicle, the exhaust system comprising:
an exhaust gas line;
an SCR catalytic converter;
an injector for introducing a reducing agent into an exhaust gas stream, wherein the injector is connected with the exhaust line upstream of the SCR catalytic converter; and
a line element arranged in the exhaust gas line between the injector and the SCR catalytic converter, the line element comprising:
a metal bellows which is corrugated in a ring-shaped or helical pattern and through which an exhaust gas stream can flow;
a conical flow guide body through which the exhaust gas stream can flow, and which tapers in the direction of flow of the exhaust gas stream and which protrudes into an inlet area of the metal bellows in a detached manner; and
an additional flow guide body, through which the exhaust gas stream flows and which protrudes into an outlet area of the metal bellows in a detached manner, said additional flow guide body comprising an additional flow guide body inlet and an additional flow guide body outlet, said additional flow guide body inlet being located in an interior of said metal bellows, said additional flow guide body outlet being located at or adjacent to an outlet of said metal bellows.

14. An exhaust system in accordance with claim 13, wherein a depositing means for deposits of urea and/or urea derivatives is arranged in the tubular body.

15. An exhaust system in accordance with claim 14, wherein at least one of:
the depositing means comprises a collection device for collecting deposits of urea derivatives; and
the depositing means comprises a flow obstacle.

16. An exhaust system in accordance with claim 13, further comprising a static mixer arranged or formed in tubular body, wherein at least one of:
the mixer is designed as a separate component and is inserted into the tubular body; or
guide blades form the mixer, the guide blades being formed on a jacket of the tubular body.

17. An exhaust system in accordance with claim 13, wherein the flow guide body comprises a material or material mixture through which flow is possible, wherein the flow guide body comprises at least one of a ceramic foam portion, wire netting and a wire mesh, said flow guide body comprising a flow guide body inlet, said flow guide body inlet having a flow guide body inlet dimension, said metal bellows having a metal bellows inlet, said metal bellows inlet having a metal bellows inlet dimension, said flow guide body inlet dimension being at least equal to said metal bellows inlet dimension.

18. An exhaust system in accordance with claim 13, wherein at least one of:

the flow guide body arranged on the inlet side protrudes with an outlet end into an inlet end of the additional flow guide body arranged on the outlet side in a detached manner; and the flow guide body arranged on the outlet side is fastened with an outlet end, via webs to the metal bellows or to a line section arranged downstream of metal bellows; and the flow guide body arranged on the outlet sides tapers at least in one longitudinal section in a direction of flow of the exhaust gas stream, said metal bellows comprising a metal bellows outlet and an inner surface defining a metal bellows interior and a plurality of corrugations, said plurality of corrugations defining at least a portion of said bellows interior, said conical flow guide body comprising a conical flow guide outlet portion, said conical flow guide outlet portion being arranged in said bellows interior, said conical flow guide outlet portion being located at a spaced location from said metal bellows outlet.

19. An internal combustion engine exhaust system line element comprising:

a corrugated metal bellows defining an exhaust gas stream flow conduit, said metal bellows comprising a metal bellows end portion and a metal bellows inner surface, said metal bellows inner surface defining a metal bellows interior space and a plurality of corrugations, said plurality of corrugations defining at least a portion of said interior space, said metal bellows end portion defining a metal bellows outlet;

a conical flow guide body through which the exhaust gas stream flows, and which tapers in the direction of flow of the exhaust gas stream, the conical flow guide body protruding into an inlet area of the metal bellows, said conical blow guide body comprising a conical flow guide body end portion, said conical flow guide body end portion defining a flow guide body outlet, said conical flow guide end portion being located in said metal bellows interior space, said conical flow guide body end portion being located at a spaced location from said metal bellows end portion; and an additional flow guide body, through which the exhaust gas stream flows and which protrudes into an area of said metal bellows outlet in a detached manner, said additional flow guide body comprising an additional flow guide body inlet and an additional flow guide body outlet, said additional flow guide body inlet being located in said metal bellows interior space, said additional flow guide body outlet being located at or adjacent to said metal bellows outlet.

* * * * *